United States Patent
Ryu et al.

(10) Patent No.: US 10,989,836 B2
(45) Date of Patent: Apr. 27, 2021

(54) PASSIVE MICROWAVE SOUNDER FOR SATELLITE, HAVING FIXED REFLECTION PLATE

(71) Applicant: Korea Aerospace Research Institute, Daejeon (KR)

(72) Inventors: Sang Burm Ryu, Daejeon (KR); Sang Gyu Lee, Daejeon (KR); Sang-soon Yong, Daejeon (KR); Eun-Su Kang, Daegu (KR); Seung Hoon Lee, Daejeon (KR); Hyeon-Cheol Lee, Daejeon (KR); Sungwook Hong, Seoul (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 205 days.

(21) Appl. No.: 15/779,406

(22) PCT Filed: Nov. 24, 2016

(86) PCT No.: PCT/KR2016/013598
§ 371 (c)(1),
(2) Date: May 25, 2018

(87) PCT Pub. No.: WO2017/090995
PCT Pub. Date: Jun. 1, 2017

(65) Prior Publication Data
US 2018/0306945 A1    Oct. 25, 2018

(30) Foreign Application Priority Data
Nov. 27, 2015    (KR) ........................ 10-2015-0167295

(51) Int. Cl.
*G01W 1/08*    (2006.01)
*B64G 1/66*    (2006.01)
(Continued)

(52) U.S. Cl.
CPC ................. *G01W 1/08* (2013.01); *B64G 1/10* (2013.01); *B64G 1/1021* (2013.01); *B64G 1/22* (2013.01);
(Continued)

(58) Field of Classification Search
CPC .. G01W 1/08; B64G 1/22; B64G 1/10; B64G 1/1021; B64G 1/66; B64G 1/105; G01V 3/12; H01Q 3/02; H01Q 15/14
(Continued)

(56) References Cited

U.S. PATENT DOCUMENTS 4,371,135 A * 2/1983 Keigler .................. B64G 1/443
                                                      126/574
5,019,768 A    5/1991 Criswell
(Continued)

FOREIGN PATENT DOCUMENTS

JP    H03-072334 U    7/1991
JP    2002-163634 A    6/2002
(Continued)

OTHER PUBLICATIONS

Supplementary European Search Report issued in corresponding European Application No. 16868891.9 dated Jun. 17, 2019.

*Primary Examiner* — Frank J McGue
(74) *Attorney, Agent, or Firm* — Foley & Lardner LLP

(57) ABSTRACT

The present invention relates to a passive microwave sounder for a satellite, having a fixed reflection plate. The passive microwave sounder for a satellite, having a fixed reflection plate includes: a motor 100 including a first rotary shaft 110 formed to extend in a progressing direction of a satellite; a first rotating reflection plate 200 forming a predetermined angle with respect to the ground surface of a nadir direction and having a first one-side surface 210 and a first other-side surface 220, the center of the first one-side
(Continued)

surface 210 being coupled to and rotating with the first rotary shaft 110, such that the first one-side surface 210 and the first other-side surface 220 alternately face the ground surface, and the second other-side surface 220 reflecting incident electromagnetic waves; an auxiliary reflection part 300 reflecting the electromagnetic waves incident from the first other-side surface 220 to a predetermined position; a reception part 400 receiving the electromagnetic waves reflected from the auxiliary reflection part 300; and a fixed reflection plate 500 fixed above the first rotating reflection plate 200 at a predetermined angle with the ground surface and reflecting the electromagnetic waves to the first one-side surface 210 or the first other-side surface 220.

6 Claims, 3 Drawing Sheets

(51) Int. Cl.
  *B64G 1/22* (2006.01)
  *G01V 3/12* (2006.01)
  *B64G 1/10* (2006.01)
  *H01Q 3/02* (2006.01)
  *H01Q 15/14* (2006.01)

(52) U.S. Cl.
  CPC .................. *B64G 1/66* (2013.01); *G01V 3/12* (2013.01); *H01Q 3/02* (2013.01); *H01Q 15/14* (2013.01); *B64G 1/105* (2013.01)

(58) Field of Classification Search
  USPC ............................................................ 342/5
  See application file for complete search history.

(56) References Cited

U.S. PATENT DOCUMENTS

| | | | | |
|---|---|---|---|---|
| 5,721,431 | A * | 2/1998 | Hersom | B64G 1/22 |
| | | | | 250/340 |
| 5,785,279 | A * | 7/1998 | Gregory | B64G 1/1021 |
| | | | | 244/158.4 |
| 5,828,447 | A * | 10/1998 | Duchon | B64G 1/22 |
| | | | | 356/152.1 |
| 6,107,770 | A * | 8/2000 | Jackson | B64G 1/28 |
| | | | | 244/165 |
| 8,902,408 | B2 * | 12/2014 | Bridges | G01C 15/002 |
| | | | | 342/118 |
| 2003/0098058 | A1 | 5/2003 | Takada et al. | |
| 2011/0037671 | A1* | 2/2011 | Vogler | H01Q 15/14 |
| | | | | 343/757 |
| 2012/0223189 | A1* | 9/2012 | Kuninaka | B64G 1/10 |
| | | | | 244/158.4 |
| 2013/0032673 | A1 | 2/2013 | Kobayashi | |
| 2014/0095077 | A1 | 4/2014 | Chan et al. | |

FOREIGN PATENT DOCUMENTS

| | | |
|---|---|---|
| JP | 2003-164078 A | 6/2003 |
| JP | 3948622 B2 | 7/2007 |
| JP | 2013-158166 A | 8/2013 |
| KR | 2014-0042130 A | 4/2014 |
| WO | WO-2015/097954 A1 | 7/2015 |

* cited by examiner

[FIG. 1]
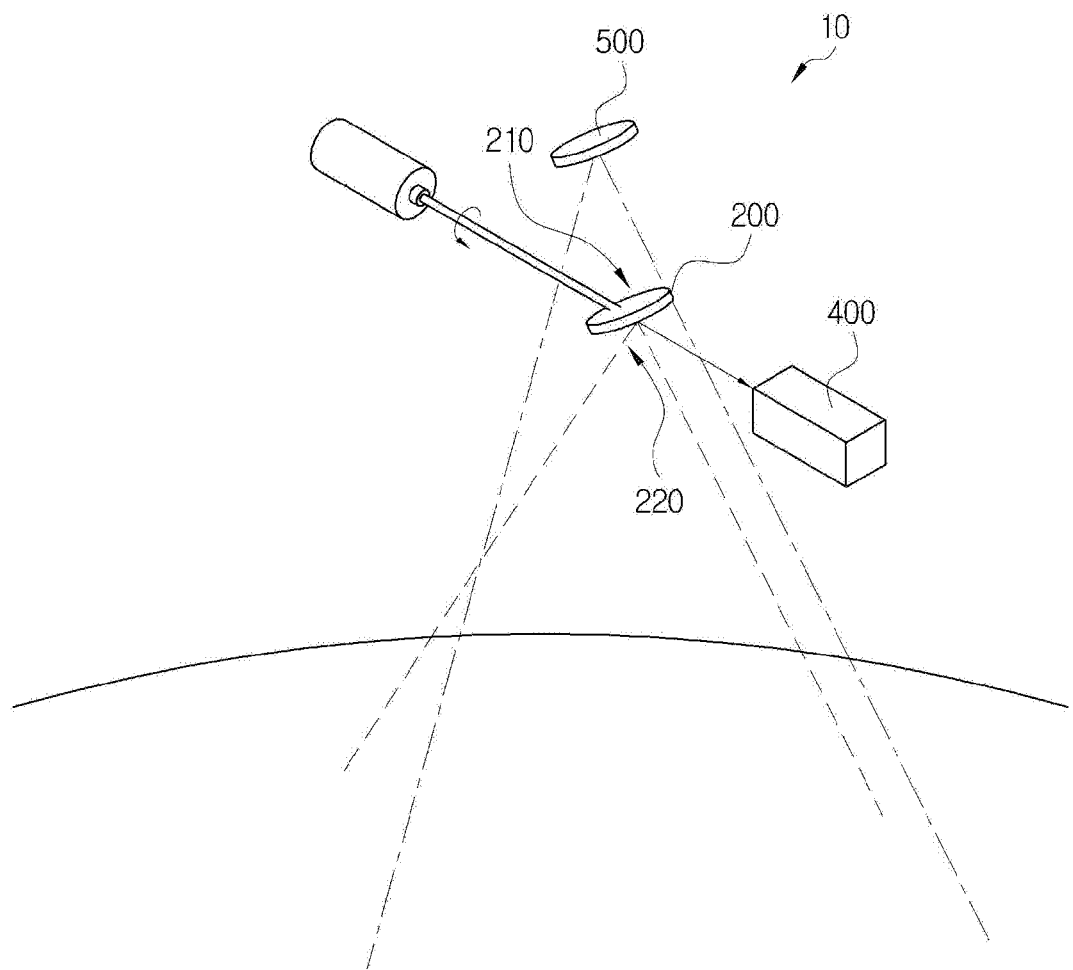

【FIG. 2】
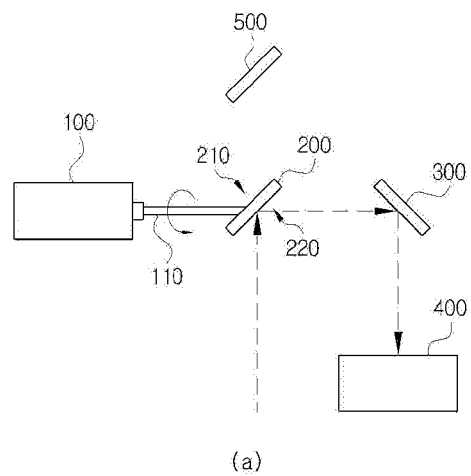
(a)
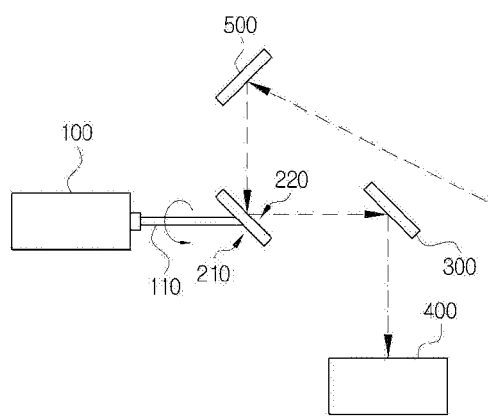
(b)

[FIG. 3]
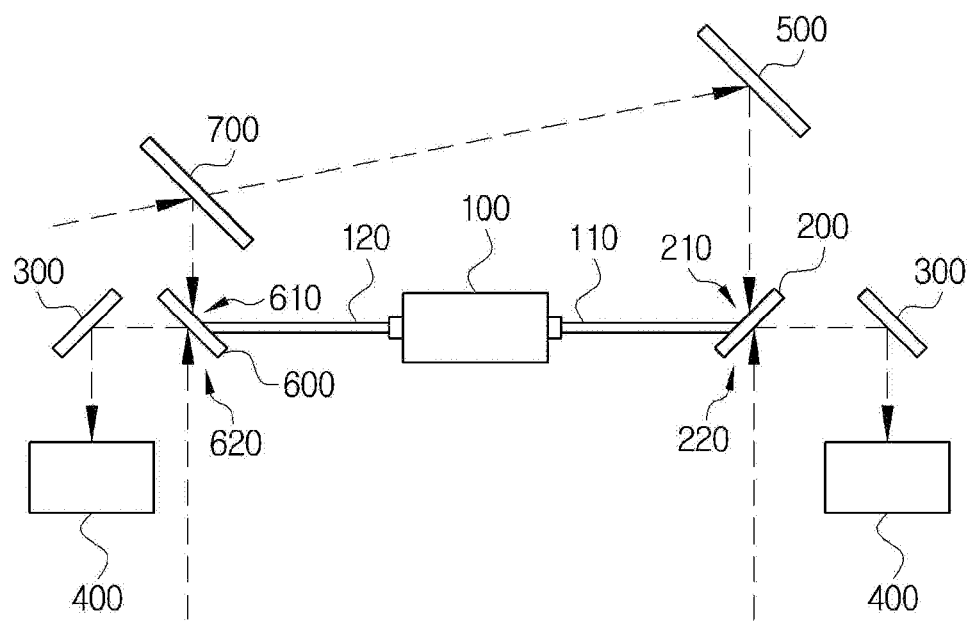

PASSIVE MICROWAVE SOUNDER FOR SATELLITE, HAVING FIXED REFLECTION PLATE

TECHNICAL FIELD

The present invention relates to a passive microwave sounder for a satellite, having a fixed reflection plate, and more particularly, a passive microwave sounder for a satellite, having a fixed reflector capable of distinguishing between horizontally and vertically polarized electromagnetic and having a function of a microwave imager with the fixed reflector.

BACKGROUND ART

A meteorological satellite is a kind of artificial satellite in which a payload performs meteorological observation, the payload of the meteorological satellite may measure electromagnetic waves such as sun reflection light or earth radiant energy emitted from the ground surface, the ocean, the atmosphere, and clouds to an outer space to observe a meteorological situation, and an observable meteorological element is changed depending on frequencies (or wavelengths) of the electromagnetic waves. A technology related to a meteorological satellite according to the related art is disclosed in Korean Patent Laid-Open Publication No. 10-2014-0042130 (entitled "System and Method of Processing Weather Satellite Information Algorithm Simulation" and published on Apr. 7, 2014), and the like.

The most important feature of the payload of the meteorological satellite is a scene scanning method for securing required observation. A general low earth orbit (LEO) satellite uses an imager in the case in which continuous observation is required, and uses a sounder in the case in which discontinuous sample observation is required. The imager mainly uses conical scanning, and the sounder mainly uses cross-track scanning.

The conical scanning mainly used in the imager is a method in which a scan mirror forms a predetermined angle with respect to the ground surface and rotates around a direct downward (i.e., nadir) direction of the scan mirror to perform conical scanning. In the case of the conical scanning, horizontal polarized waves and vertical polarized waves of electromagnetic waves incident at a predetermined angle with respect to the ground surface may be distinguished from each other, and predetermined image information is thus required, and the conical scanning is a manner appropriate for the imager for measuring a horizontal temperature at a specific altitude and then converting the horizontal temperature into an amount of precipitation. Frequencies of electromagnetic waves used by the imager with the conical scanning are in a range of 6 GHz to 80 GHz, which is a relative low frequency range, and since the imager measures a continuous section, a size of a reflector becomes 1 m or more, such that a payload becomes relatively heavy.

The cross-track scanning mainly used in the sounder is a method in which a scan mirror rotates around a moving direction of a satellite to scan a wide range in a nadir direction. In the case of the cross-track scanning, the scan mirror continuously rotates without forming a predetermined angle with respect to the ground surface, and horizontal polarized waves and vertical polarized waves of incident electromagnetic waves may not be thus distinguished from each other, but the cross-track scanning may measure a range larger than that of the conical scanning. Therefore, the cross-track scanning is a manner appropriate for the sounder measuring vertical oxide and water vapor distributions. Frequencies of electromagnetic waves measured by the sounder are 50 GHz, 183 GHz, or the like, which is a high frequency, and since a band of the frequencies of electromagnetic waves measured by the sounder is discontinuous, a reflector becomes small, such that a payload becomes relatively lightweight.

The frequencies measured by the imager and the sounder are briefly described below. The imager measures all the electromagnetic waves in a frequency band having a predetermined range, as described above. The sounder measures electromagnetic waves in a predetermined frequency range as needed, this frequency range is called as a channel, and one sounder may measure electromagnetic waves of a plurality of channels. Performances and design requirements of the sounder may be changed depending on the number and resolution of measurable channels.

Recently, importance of a numerical weather prediction model is gradually increased due to a rapid climate change, and a sounder mounted with a thermal infrared channel and a microwave channel is thus used in a meteorological satellite in order to measure an accurate water vapor vertical distribution. However, since the sounder does not distinguish the horizontal polarized waves and the vertical polarized waves from each other as described above, accuracy is decreased. In order to solve such a problem, a probing channel is recently added to the imager to utilize the imager as an image sounder. However, since a weight of the imager itself is heavy and the reflector is large, a method of bundling and using several feedhorn antennas for the probing channel and receivers is used, which is not appropriate for implementing the payload.

TECHNICAL PROBLEM

An object of the present invention is to provide a passive microwave sounder for a satellite, having a fixed reflection plate capable of being lightweight, including some of performances of an imager by distinguishing horizontal polarized waves and vertical polarized waves from each other, measuring clouds of a vertical distribution, and having improved accuracy.

TECHNICAL SOLUTION

In one general aspect, a passive microwave sounder for a satellite, having a fixed reflection plate includes: a motor 100 including a first rotary shaft 110 formed to extend in a progressing direction of a satellite; a first rotating reflection plate 200 forming a predetermined angle with respect to the ground surface of a nadir direction and having a first one-side surface 210 and a first other-side surface 220, the center of the first one-side surface 210 being coupled to and rotating with the first rotary shaft 110, such that the first one-side surface 210 and the first other-side surface 220 alternately face the ground surface, and the second other-side surface 220 reflecting incident electromagnetic waves; an auxiliary reflection part 300 reflecting the electromagnetic waves incident from the first other-side surface 220 to a predetermined position; a reception part 400 receiving the electromagnetic waves reflected from the auxiliary reflection part 300; and a fixed reflection plate 500 fixed above the first rotating reflection plate 200 at a predetermined angle with the ground surface and reflecting the electromagnetic waves to the first one-side surface 210 or the first other-side surface 220.

The electromagnetic waves emitted from the ground surface may be sequentially received in the reception part 400 through the first other-side surface 220 and the auxiliary reflection part 300 when the first other-side surface 220 faces the ground surface, and may be sequentially received in the reception part 400 through the fixed reflection plate 500, the first other-side surface 220, and the auxiliary reflection part 300 when the first other-side surface 220 faces upward.

The motor 100 may further include a second rotary shaft 120 formed on an opposite side surface to a side surface on which the first rotary shaft 110 is formed and connected to the first rotary shaft 110 to rotate simultaneously with the first rotary shaft 110, and the passive microwave sounder for a satellite, having a fixed reflection plate further comprising a second rotating reflection plate 600 forming a predetermined angle with respect to the ground surface of the nadir direction and having a second one-side surface 610 and a second other-side surface 620, the center of the second one-side surface 610 being coupled to and rotating with the second rotary shaft 120, such that the second one-side surface 610 and the second other-side surface 620 alternately face the ground surface, and the second other-side surface 620 reflecting incident electromagnetic waves, when the passive microwave sounder for a satellite, having a fixed reflection plate is a sounder for an meteorological satellite, having a fixed reflection plate.

The passive microwave sounder for a satellite, having a fixed reflection plate may further include a frequency filter 700 installed at the same angle as that of the fixed reflection plate 500 above the second rotating reflection plate 600 and reflecting electromagnetic waves having frequencies in a predetermined range to the second rotating reflection plate 600 and passing electromagnetic waves having frequencies in a range except for the predetermined range therethrough and then transmitting the electromagnetic waves to the fixed reflection plate 500, when the passive microwave sounder for a satellite, having a fixed reflection plate is the sounder for an meteorological satellite, having a fixed reflection plate.

The first other-side surface 220 and the second other-side surface 620 may alternately face the ground surface.

The first rotating reflection plate 200 may use a cross-track scanning manner.

ADVANTAGEOUS EFFECTS

According to the present invention, the fixed reflection plate may distinguish horizontal polarized waves and vertical polarized waves of electromagnetic waves from each other, and an amount of precipitation as well as a vertical temperature distribution may be measured.

In addition, according to the present invention, the fixed reflection plate is installed in the sounder, such that the sounder may be lightweight and have some of functions of an imager.

Further, according to the present invention, even when a rotating reflection plate faces upward, reflected electromagnetic waves are received in the fixed reflection plate, such that accuracy of observation is increased.

DESCRIPTION OF DRAWINGS

FIG. 1 is a use schematic view of a passive microwave sounder for a satellite, having a fixed reflection plate according to the present invention.

FIGS. 2A and 2B are conceptual diagrams of a passive microwave sounder for a satellite, having a fixed reflection plate according to a first exemplary embodiment of the present invention.

FIG. 3 is a conceptual diagram of a microwave sounder having a fixed reflection plate according to a second exemplary embodiment of the present invention.

BEST MODE

Hereinafter, a passive microwave sounder for a satellite, having a fixed reflection plate according to the present invention will be described in detail with reference to the accompanying drawings. After a first exemplary embodiment including basic components is described, a second exemplary embodiment in which some components are added is described.

First Exemplary Embodiment

As illustrated in FIGS. 1 to 2B, a passive microwave sounder for a satellite, having a fixed reflection plate according to a first exemplary embodiment of the present invention is a sounder mounted in a meteorological satellite 10, and is configured to include a motor 100, a first rotating reflection plate 200, an auxiliary reflection part 300, a reception part 400, and the fixed reflection plate 500.

The motor 100 includes a first rotary shaft 110 formed to extend in a progressing direction of the satellite. The motor 100 and the first rotary shaft 110 are components rotating the first rotating reflection plate 200 to be described below.

As illustrated in FIGS. 2A and 2B, the first rotating reflection plate 200, which is a component configured to include a first one-side surface 210 and a first other-side surface 220, forms a predetermined angle with respect to the ground surface of a nadir direction, and the center of the first one-side surface 210 is coupled to and rotates with the first rotary shaft 110, such that the first one-side surface 210 and the first other-side surface 220 alternately face the ground surface. The first rotating reflection plate 200 forms the predetermined angle with respect to the ground surface of the nadir direction, but the predetermined angle is changed by rotation of the first rotary shaft 110. A fixed angle is an angle between the first rotating reflection plate 200 and the first rotary shaft 110 when viewing the first rotating reflection plate 200 from a side as in FIG. 1, and is changed depending on a scanning environment or a target range, but is generally 45 degrees. As described above in the Background Art, the rotation of the first rotating reflection plate 200 is a feature of the cross-track scanning. Since the first rotary shaft 110 is formed to extend in the progressing direction of the satellite and rotates, an angle formed by the first rotating reflection plate 200 and the ground surface is continuously changed, and horizontal polarized waves and vertical polarized waves of electromagnetic waves emitted from the earth may not be distinguished from each other due to the rotational motion as described above. Instead, the first rotating reflection plate 200 measures a wide range in the nadir direction, as illustrated in FIG. 1, while rotating. Since the meteorological satellite is generally a low earth orbit (LEO) satellite, an observation range of the cross-track scanning illustrated in FIG. 1 is about 2,400 Km.

The first one-side surface 210 is a component of which the center is coupled to and rotating with the first rotary shaft 110. Electromagnetic waves incident to the first one-side surface 210 are not reflected to the reception part 400. This is to distinguish electromagnetic waves reflected through the first rotating reflection plate 200 and the fixed reflection plate 500 from each other.

The first other-side surface 220 is a component forming the predetermined angle with respect to the first rotary shaft 110 as described above and reflecting the electromagnetic waves reflected through the earth or the fixed reflection plate 500 to the reception part 400. Since the first one-side surface 210 and the first other-side surface 220 rotate, the first one-side surface 210 and the first other-side surface 220 alternately face the ground surface or the fixed reflection plate 500 installed thereabove, which is illustrated in FIGS. 2A and 2B. FIG. 2A illustrates a state in which the first one-side surface 210 faces the fixed reflection plate 500 installed thereabove and the first other-side surface 220 faces the ground surface, and electromagnetic waves incident from the ground surface are reflected through the first other-side surface 220 and the auxiliary reflection part 300, and are then incident to the reception part 400. FIG. 2B illustrates a state in which the first one-side surface 210 faces the ground surface and the first other-side surface 220 faces the fixed reflection plate 500 installed thereabove, and electromagnetic waves incident from the ground surface are reflected through the fixed reflection plate 500, the first other-side surface 220, and the auxiliary reflection part 300, and are then incident to the reception part 400.

As illustrated in FIGS. 2A and 2B, the auxiliary reflection part 300 is a component reflecting the electromagnetic waves incident from the first other-side surface 220 to a predetermined position. The position to which the auxiliary reflection part 300 reflects the electromagnetic waves is the reception part 400 as illustrated in FIGS. 2A and 2B. The auxiliary reflection part 300 includes a primary mirror (not illustrated) serving to collect the electromagnetic waves reflected from the first rotation reflection plate 200 at one place and a secondary mirror (not illustrated) again reflecting the electromagnetic waves collected by the primary mirror. The electromagnetic waves received through the auxiliary reflection part 300 are recoded in the reception part 400 in a state in which they are divided into the respective channels depending on their frequencies.

The reception part 400 receives the electromagnetic waves reflected from the auxiliary reflection part 300. The electromagnetic waves received in the reception part 400 are recoded in a state in which they are divided into the respective channels depending on frequency bands, as described above. The received electromagnetic waves are received in a state in which they are divided into a visible channel, a near infrared channel, a water vapor channel, an infrared channel, and a microwave range depending on the frequency bands.

The fixed reflection plate 500 is fixed above the first rotating reflection plate 200 at a predetermined angle with the ground surface, and reflects the electromagnetic waves to the first one-side surface 210 or the first other-side surface 220. A description for an operation of the fixed reflection plate 500 is the same as the description for the operation of the first rotating reflection plate 200. When the first other-side surface 220 faces the ground surface, the fixed reflection plate 500 reflects the electromagnetic waves to the first one-side surface 210, but these electromagnetic waves are not received in the reception part 400. When the first other-side surface 220 faces the fixed reflection plate 500, the electromagnetic waves reflected from the fixed reflection plate 500 are received in the reception part 400 through the first other-side surface 220.

In other words, the electromagnetic waves emitted from the ground surface are received in the reception part 400 through different paths depending on a position of the first rotating reflection plate 200, and these paths include a first path passing through the first other-side surface 220, the auxiliary reflection part 300, and the reception part 400 and a second path passing through the fixed reflection plate 500, the first other-side surface 220, the auxiliary reflection part 300, and the reception part 400. A time in which the first path or the second path is incident is a half of a rotation period of the first rotating reflection plate 200.

In the cross-track scanning manner according to the related art, when a rotating mirror receiving and reflecting the electromagnetic waves does not face the ground surface, the electromagnetic waves may not be received. In a first exemplary embodiment of the present invention, in order to overcome such a problem, the fixed reflection plate 500 is additionally installed. Therefore, even though the first other-side surface 220 faces upward, the electromagnetic waves are continuously received through the fixed reflection plate 500, such that accuracy is increased. In addition, since the fixed reflection plate 500 forms the predetermined angle with respect to the ground surface, vertical polarized waves and horizontal polarized waves of the electromagnetic waves reflected through the fixed reflection plate 500 may be distinguished from each other, such that some of functions of an imager may be utilized.

Second Exemplary Embodiment

Hereinafter, a microwave sounder having a fixed reflection plate according to the present invention will be described in detail with reference to the accompanying drawing.

FIG. 3 is a schematic view illustrating a microwave sounder having a fixed reflection plate according to a second exemplary embodiment of the present invention in which some components are added to the passive microwave sounder for a satellite, having a fixed reflection plate according to a first exemplary embodiment of the present invention.

As illustrated in FIG. 3, the microwave sounder having a fixed reflection plate according to a second exemplary embodiment of the present invention includes a motor 100, a first rotating reflection plate 200, an auxiliary reflection part 300, a reception part 400, a fixed reflection plate 500, a second rotating reflection plate 600, and a frequency filter 700. The first rotating reflection plate 200, the auxiliary reflection part 300, the reception part 400, and the fixed reflection plate 500 are the same as those of the passive microwave sounder for a satellite, having a fixed reflection plate according to a first exemplary embodiment of the present invention, and a description therefore is thus omitted.

As illustrated in FIG. 3, the motor 100 further includes a second rotary shaft 120 formed on an opposite side surface to a side surface on which the first rotary shaft 110 is formed and connected to the first rotary shaft 110 to rotate simultaneously with the first rotary shaft 110. The second rotary shaft 120 rotates simultaneously with the first rotary shaft 110 in order to allow rotation displacements of the second rotating reflection plate 600 (to be described below) coupled to the second rotary shaft 120 and the first rotating reflection plate 200 to coincide with each other, which is described below.

The second rotating reflection plate 600 forms a predetermined angle with respect to the ground surface of a nadir direction and has a second one-side surface 610 and a second other-side surface 620, the center of the second one-side surface 610 is coupled to and rotates with the second rotary shaft 120, such that the second one-side surface 610 and the second other-side surface 620 alternately face the ground surface, and the second other-side surface 620 reflects incident electromagnetic waves. The second rotating reflection plate 600 is a component corresponding to the first rotating reflection plate 200, and plays the same role as that of the first rotating reflection plate 200. However, the auxiliary reflection part 300 and the reception part 400 may be additionally provided so as to correspond to the fact the second rotating reflection plate 600 is provided at an opposite side of the first rotating reflection plate 200, and even though the auxiliary reflection part 300 and the reception part 400 are not additionally provided, the second rotating reflection plate 600 may use the existing auxiliary reflection part 300 and reception part 400. To this end, additional optical equipments (a mirror and other components) may be provided.

The frequency filter 700 is installed at the same angle as that of the fixed reflection plate 500 above the second rotating reflection plate 600, and reflects electromagnetic waves having frequencies in a predetermined range to the second rotating reflection plate 600 and passes electromagnetic waves having frequencies in a range except for the predetermined range therethrough and then transmits the electromagnetic waves to the fixed reflection plate 500. A role of the frequency filter 700 reflecting the electromagnetic waves having the frequencies in the predetermined range is the same as that of the fixed reflection plate 500. The electromagnetic waves reflected from the frequency filter 700 are received in the reception part 400 through the second other-side surface 620 of the second rotating reflection plate 600 and the auxiliary reflection part 300. This is a configuration for receiving electromagnetic waves of more channels or improving efficiency by dualizing electromagnetic waves in a frequency band reflected by the first rotating reflection plate 200 and the second rotating reflection plate 600.

The present invention is not limited to the abovementioned exemplary embodiments, but may be variously applied. In addition, the present invention may be variously modified by those skilled in the art to which the present invention pertains without departing from the gist of the present invention claimed in the claims.

DETAILED DESCRIPTION OF MAIN ELEMENTS

10: meteorological satellite
100: motor
110: first rotary shaft 120: second rotary shaft
200: first rotating reflection plate
210: first one-side surface 220: second other-side surface
300: auxiliary reflection part
400: reception part
500: fixed reflection plate
600: second rotating reflection plate
610: second one-side surface 620: second other-side surface

The invention claimed is:

1. A passive microwave sounder for a satellite, having a fixed reflection plate, comprising:

a motor including a first rotary shaft formed to extend in a progressing direction of a satellite;

a first rotating reflection plate forming a predetermined angle with respect to a ground surface of a nadir direction and having a first one-side surface and a first other-side surface, the center of the first one-side surface being coupled to and rotating with the first rotary shaft, such that the first one-side surface and the first other-side surface alternately face the ground surface, and the first other-side surface reflecting incident electromagnetic waves;

an auxiliary reflection part reflecting the electromagnetic waves incident from the first other-side surface to a predetermined position;

a reception part receiving the electromagnetic waves reflected from the auxiliary reflection part; and the fixed reflection plate being fixed above the first rotating reflection plate at a predetermined angle with the ground surface, the fixed reflection plate being configured to directly receive the electromagnetic waves from the ground surface and reflect the electromagnetic waves to the first one-side surface or the first other-side surface.

2. The passive microwave sounder of claim 1, wherein the electromagnetic waves emitted from the ground surface are sequentially received in the reception part through the first other-side surface and the auxiliary reflection part when the first other-side surface faces the ground surface, and are sequentially received in the reception part through the fixed reflection plate, the first other-side surface, and the auxiliary reflection part when the first other-side surface faces upward.

3. The passive microwave sounder of claim 1, wherein the motor further includes a second rotary shaft formed on an opposite side surface to a side surface on which the first rotary shaft is formed and connected to the first rotary shaft to rotate simultaneously with the first rotary shaft, and the passive microwave sounder further comprises a second rotating reflection plate forming a predetermined angle with respect to the ground surface of the nadir direction and having a second one-side surface and a second other-side surface, the center of the second one-side surface being coupled to and rotating with the second rotary shaft, such that the second one-side surface and the second other-side surface alternately face the ground surface, and the second other-side surface reflecting incident electromagnetic waves.

4. The passive microwave sounder of claim 3, further comprising a frequency filter installed at the same angle as that of the fixed reflection plate above the second rotating reflection plate and reflecting electromagnetic waves having frequencies in a predetermined range to the second rotating reflection plate and passing electromagnetic waves having frequencies in a range except for the predetermined range therethrough and then transmitting the electromagnetic waves to the fixed reflection plate.

5. The passive microwave sounder of claim 3, wherein the first other-side surface and the second other-side surface alternately face the ground surface.

6. The passive microwave sounder of claim 1, wherein the first rotating reflection plate uses a cross-track scanning manner.

* * * * *